United States Patent [19]

Beggs

[11] 4,296,797
[45] Oct. 27, 1981

[54] RIGID SHELL FOR BUILDING STRUCTURES

[76] Inventor: George R. Beggs, 602 S. Tejon, Colorado Springs, Colo. 80903

[21] Appl. No.: 100,954

[22] Filed: Dec. 6, 1979

[51] Int. Cl.³ .......................................... F25B 29/00
[52] U.S. Cl. .................................. 165/48 S; 52/648; 126/429; 126/430
[58] Field of Search .................... 52/79.12, 173, 648, 52/650, 303; 126/430, 431, 429; 165/48 S

[56] References Cited

U.S. PATENT DOCUMENTS

| | | | |
|---|---|---|---|
| 2,559,871 | 7/1951 | Gay | 126/429 |
| 3,331,170 | 7/1967 | Lowe et al. | 52/648 |
| 3,812,903 | 5/1974 | Thomason | 165/48 S |
| 3,829,999 | 8/1974 | Bernstein | 52/648 |
| 4,239,031 | 12/1980 | Granger | 126/430 |

FOREIGN PATENT DOCUMENTS 2630120  1/1978  Fed. Rep. of Germany ..... 52/79.12

*Primary Examiner*—John E. Murtagh
*Attorney, Agent, or Firm*—Hubbell, Cohen, Stiefel & Gross

[57] ABSTRACT

A rigid shell or framework (10) for a building structure, comprising a first pair of spaced supporting frames (11, 12) defining the end walls of the shell, a second pair of spaced supporting frames (13, 14) disposed at right angles to the first pair of frames and defining the side walls of the shell, and a plurality of further supporting frames (15) disposed intermediate the first pair of supporting frames, being supported by the second pair of frames, and in turn providing the structural support for the side walls, roof and floor defined by the rigid shell.

The first pair of supporting frames comprises a pair of vertical load-bearing members (18, 19) integral with and secured to a pair of horizontal load-bearing elements (16, 17) at points spaced from the ends of such elements by from ⅛th to ¼th their respective lengths. Vertical load-bearing members (22, 23) of the second pair of supporting frames (13, 14) also abut and are secured to the vertical load-bearing members (18, 19) of the first supporting frames (11, 12) along substantially their entire lengths to define four load-bearing columns (24) for the shell.

Internal sheathing (37) and an external skin (38) provided on the plurality of further supporting frames (15) of the rigid shell define an annular cavity (43) extending about the periphery of the shell for solar heat collection and air circulation therethrough. The integral shell structure thus inherently defines an air circulation path extending about the side walls (39, 40), roof (41), and base (42) of the structure to facilitate efficient use of the structure for solar energy heat transmission.

8 Claims, 5 Drawing Figures

RIGID SHELL FOR BUILDING STRUCTURES

TECHNICAL FIELD

The present invention relates to a rigid shell or framework for a building structure, and more particularly to such a shell or framework which imparts structural stability yet which is free of internal structural framing members whereby to provide the entire interior volume thereof free for design purposes.

The invention further relates to such a shell or framework for a building structure, which provides an integral solar collection and air circulation cavity to facilitate solar heating of the structure.

The invention may be utilized in connection with any form of building construction, and is particularly applicable to home construction.

DISCLOSURE OF INVENTION

In accordance with the present invention, a rigid shell for a building structure is provided, comprising a first pair of spaced supporting frames defining the end walls of the shell, a second pair of spaced supporting frames disposed at right angles to the first pair of frames which imparts structural stability to the first pair and thus provides a rigid three dimensional frame, and a plurality of further supporting frames disposed intermediate the first pair of supporting frames, being supported by the second pair of frames, and in turn providing the structural support for the side walls, roof and floor defined by the rigid shell.

In order to provide structural stability against eccentric and torsional loading as well as simple axial loading of the shell, each member of the first pair of supporting frames comprises a pair of vertical load-bearing members integral with and secured to a pair of horizontal load-bearing elements at points spaced from the ends of the horizontal elements by from ⅛th to ¼th their respective lengths. At the same time, the vertical load-bearing members of the second pair of supporting frames abut and are secured to the vertical load-bearing members of the first supporting frames along substantially their entire lengths to define four load-bearing columns for the shell. In addition, structural sheathing materials are provided on at least 20% of the side, end wall, and roof surfaces defined by the rigid shell to further impart structural stability thereto. There is thus provided a relatively simple, stable architectural shell or framework which provides an internal, unobstructed volume which is free of structural framing members and which may be readily utilized for any desired design purposes.

In accordance with a further feature of the invention, internal sheathing and an external skin provided on the plurality of further supporting frames of the rigid shell define an annular cavity extending about the periphery of the shell for solar heat collection and air circulation therethrough. The integral shell structure thus inherently defines an air circulation path extending about the side walls, roof and base of the structure to facilitate efficient use of the structure for solar energy heat transmission.

BRIEF DESCRIPTION OF THE DRAWINGS

The details of the present invention will be described in connection with the accompanying drawings, in which.

Figure 1:
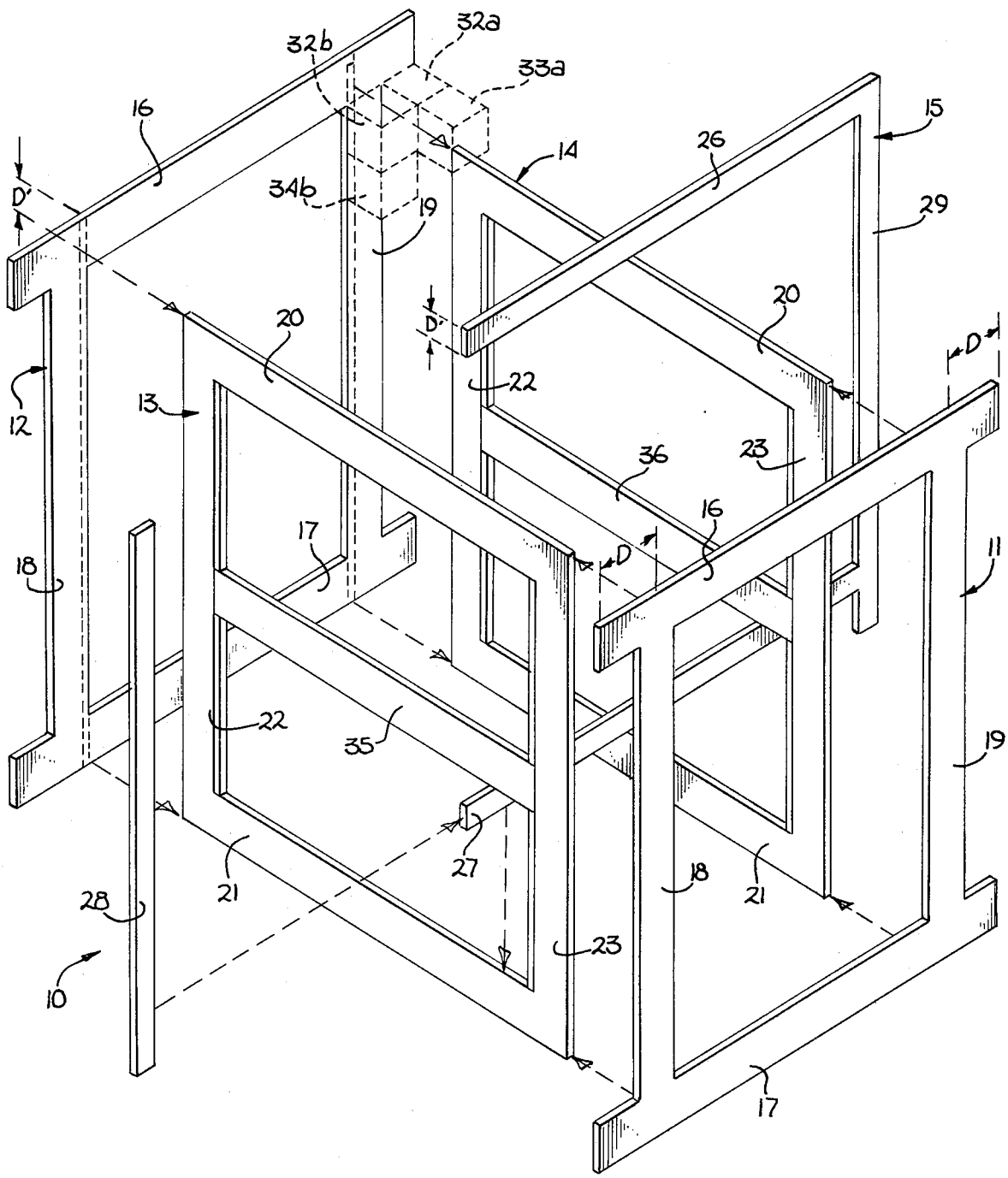
FIG. 1 is a partially schematic exploded isometric view showing the construction of the rigid shell or framework of the invention.

Various objects and advantages of the building construction of the invention will be more fully apparent from the following description of the preferred form of the invention illustrated in the drawings.

BEST MODE FOR CARRYING OUT THE INVENTION

Figure 2:
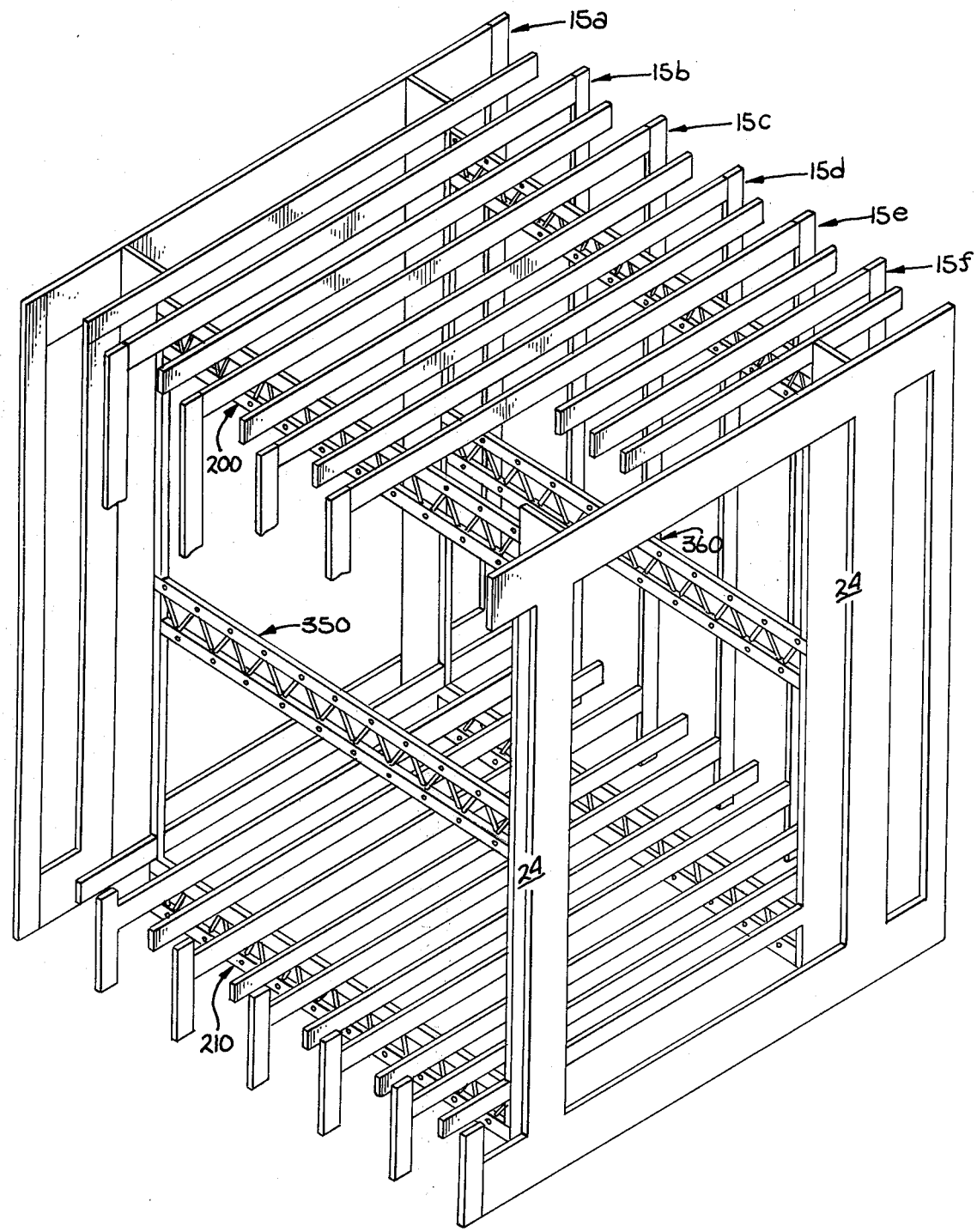
FIG. 2 is a partially broken-away, perspective view of one preferred form of the rigid shell hereof.

Referring initially to FIG. 1, a rigid shell or framework 10 constructed in accordance with the invention is illustrated. The shell comprises a first pair of rigid, vertical supporting frames 11 and 12 disposed parallel to and spaced from one another by a distance equal to the length of the shell, and a second pair of rigid, vertical supporting frames 13 and 14 disposed parallel to and spaced from one another widthwise of the shell and at right angles to the first pair of frames 11 and 12. A plurality of further rigid, vertical supporting frames 15 (one of which is illustrated in FIG. 1, and a number of which, viz, frames 15a, 15b, 15c, 15d, 15e and 15f, are shown in FIG. 2) are disposed in spaced relation lengthwise of shell 10, intermediate and parallel to the first pair of supporting frames 11 and 12.

The three sets of supporting frames are secured to one another so as to provide a rigid framework for any desired building structure, which is stable with respect to any anticipated climatic loading conditions, whether applied uniformly and axially to any of the surfaces thereof or impressed eccentrically and/or torsionally thereon. To this end, each of the first pair of supporting frames 11 and 12 comprises a pair of spaced, horizontally disposed load-bearing elements 16 and 17, and a pair of spaced vertically disposed load-bearing members 18 and 19 integral therewith and secured thereto. Members 18 and 19 are secured to the pair of horizontal elements 16 and 17 at points spaced from the ends of such elements by a distance D. That distance is suitably from about ⅛th to ¼th the length of the respective horizontal elements and, in order to define the preferred six unit modular grid described hereinafter, is preferably about 1/6th the length thereof.

Similarly, each of the second pair of supporting frames 13 and 14 comprises a second pair of spaced, horizontally disposed load-bearing elements 20 and 21, and a second pair of spaced, vertically disposed load-bearing members 22 and 23 integral with and secured thereto. The vertical members 22 and 23 of the second pair of frames 13 and 14 abut the corresponding vertical members 18 and 19 of the first pair of frames 11 and 12 and are secured thereto along substantially their entire lengths to define four vertically disposed, load-bearing columns 24 for the shell (see FIGS. 2 and 3). Thus, in a preferred form of the invention wherein the respective frame elements and members may be in the form of I-beams, the load-bearing columns may have L-shaped or T-shaped cross-sections (see 25a and 25b in FIG. 3), the individual legs of which are defined by the respective load-bearing members.

Each of the further plurality of supporting frames 15 comprises a third pair of spaced, horizontally disposed load-bearing elements 26 and 27, and a third pair of spaced, vertically disposed load-bearing members 28 and 29 integral with and secured thereto. The horizontal elements extend across and are supported by the respective horizontal elements of each of the second pair of supporting frames 13 and 14. Thus, horizontal element 26 of frame 15 is illustrated as supported by horizontal elements 20 of the second pair of frames 13 and 14, and horizontal element 27 of frame 15 is shown as supported by horizontal elements 21 of frames 13 and 14. The further frames 15 thus interengage with and are supported by the second pair of supporting frames 13 and 14 defining the integral, rigid framework of the invention.

Preferably, the upper surfaces of the first pair of frames 11 and 12 and the plurality of further frames 15 are substantially co-planar to facilitate the application of a uniform skin to the shell structure. For that purpose, the upper horizontal element 20 of each of the second pair of frames 13 and 14 is secured to the corresponding vertical members (18 and 19, respectively) of the first pair of frames 11 and 12 at points spaced from the upper ends of the vertical members by a distance D' equal to the depth of the horizontal element 26 of each further frame 15.

The plurality of further frames 15 define and provide the structural support for the side walls, roof and floor of the building structure defined by the rigid shell construction. As indicated below in connection with the embodiment of the invention illustrated in FIG. 4, the further frames 15 may support internal sheathing and an external skin structure defining an annular cavity extending about the periphery of the shell for solar heat collection and air circulation therethrough. However, whether or not the further supporting frames 15 are so utilized, it has been found necessary to provide structurally supporting materials, e.g., plywood siding or the like on at least 20% of the outer surface area defined by the shell to impart sufficient stability to resist high average wind and snow or other climatic loading conditions applied thereto.

It will be understood that, depending upon the particular environmental conditions for which the particular building structure is to be designed, it may be necessary to provide a structurally supporting material skin on a greater proportion of the outer surface area of the rigid shell. In most cases, however, up to 80% of the side and end wall and roof surfaces defined by the shell may either be void (open) or non-structurally enclosed. That portion of the outer surface of the framework may thus be designed to conform to specific environmental requirements or in accordance with particular esthetic desires by the selection of finishing materials having varying textures, colors, weights, thermal values and/or degrees of light transmissivity.

The rigid shell hereof may be constructed of any desired structural materials. The shell or framework may thus comprise either steel or wood beams of any conventional configurations, based upon the size of the specific structure to be designed, site conditions and the availability, cost and structural properties of feasible materials.

Figure 3:
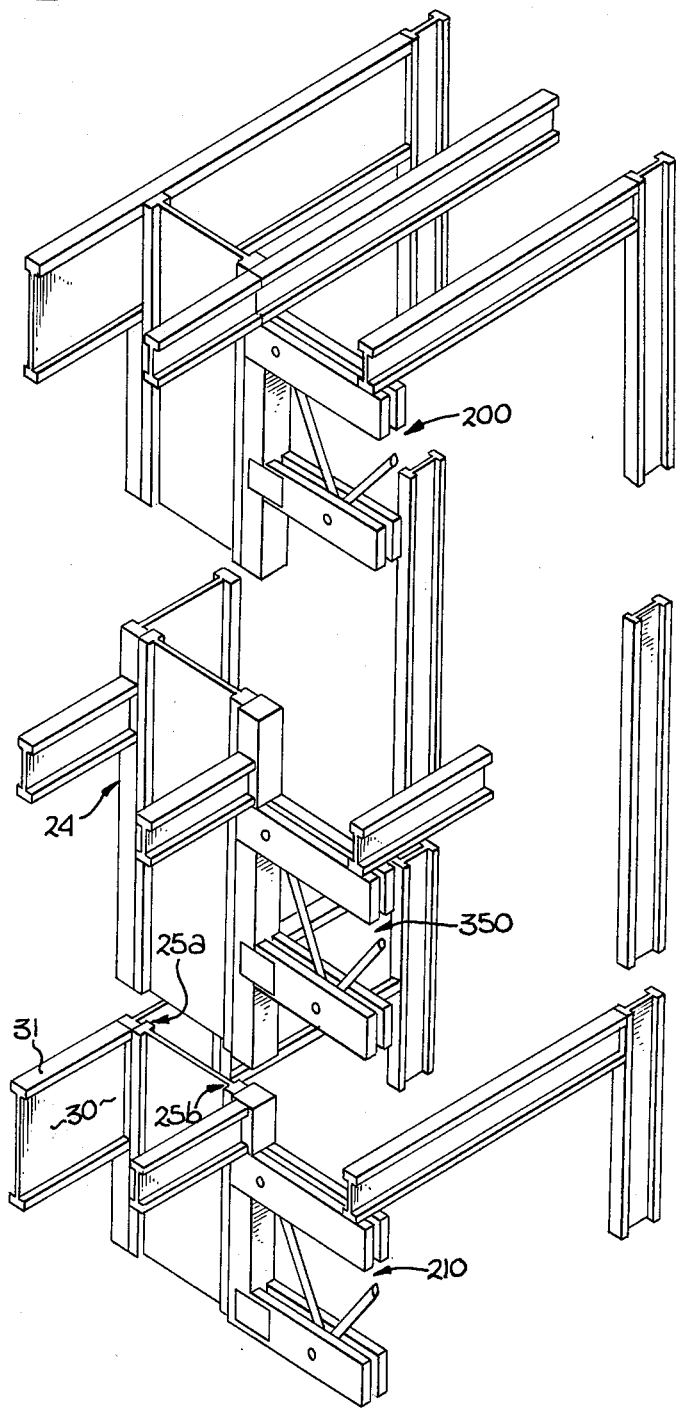
FIG. 3 is an expanded, partially broken-away view of a portion of the structure of the preferred embodiment illustrated in FIG. 2.

In the preferred embodiment shown in FIGS. 2 and 3 a cubical shell which may, for example, have 24' edge dimensions, and which is suitable for the construction of a home, is illustrated. In this embodiment, each of the supporting frames may be constructed of wood I-beams having, for example, plywood webs 30 and wood or pressed board flanges 31. Employing such materials, the first pair of supporting frames 11 and 12 may suitably have 24" depths and incorporate $1\frac{1}{2}"\times 2\frac{1}{2}"$ flanges and a $\frac{1}{2}"$ thickness web. Similarly, the vertical members 18 and 19 of the first pair of frames 11 and 12, and the vertical members 22 and 23 of the second pair of frames 13 and 14, may each have 20" depths and incorporate $1\frac{1}{2}"\times 2\frac{1}{2}"$ flanges and a $\frac{1}{2}"$ web. Similarly, both the horizontal elements 26 and 27 and vertical elements 28 and 29 of further frames 15 may each suitably have 10" depths and incorporate $1\frac{1}{2}"\times 2\frac{1}{2}"$ flanges and a $\frac{1}{2}"$ web.

In the preferred embodiment illustrated, the horizontal load-bearing elements 20 and 21 of frames 13 and 14 may suitably comprise composite beams 200 and 210, such as those commercially known as "Truss Joists". Such bearing members are essentially wood I-beams made by gluing wood or composite glue and wood fiber flanges to a plywood web. Composite beams useful in the embodiment shown may comprise a 24" deep built-up beam (an open web joist), utilizing $4"\times 6"$ stringers with a $\frac{3}{4}"$ steel pipe web. The use of composite beams 200 and 210 in the embodiment shown may be substituted by wide-flange steel bearing members in larger steel frame structures, or by standard nominal dimension framing lumber in smaller structures.

It will further be understood that the nature, configurations and dimensions of the structural elements utilized in the embodiment illustrated in FIGS. 2 and 3 are given as illustrative only, and that the present invention is not limited thereto. Rather, the specific structural elements utilized in the rigid building shell or framework of this invention should be determined by conventional structural engineering considerations based upon the size of the specific structure to be erected, site conditions and the like.

THE "CUBE HOUSE" DESIGN

As indicated hereinabove, the rigid shell provided in accordance herewith defines an internal volume which is entirely free of structural support elements and which is thus available for any desired architectural use. Desirably, the shell is divided into a plurality of modular zones defining structural unit volumes for design purposes. For example, as partially indicated by dotted line representation in FIG. 1, the preferred embodiments illustrated may be divided into a number of individual modules, comprising six rows of modules 32a, 33a and 32b; 34b; etc., disposed parallel to the horizontal elements 16 and 17 of the pair of supporting frames 11 and 12; six columns of modules 32a and 33a; 32b and 34b; etc., disposed parallel to the vertical members 18 and 19 of such frames; and a number of rows of modules 32a, 32b and 34b; 33a; etc., disposed parallel to the further supporting frames 15.

Where the rigid shell provides for a six module grid as described hereinabove, each of the vertical members 18 and 19 of the first pair of supporting frames 11 and 12 is secured to the pair of horizontal elements 16 and 17 of the respective frames at a point spaced from the ends of such elements by 1/6th of their lengths, i.e., as depicted in FIG. 1 the distance D is 1/6th the length of elements 16 and 17. The shell or framework 10 thus conveniently defines a uniform six module space grid which may be utilized for internal design purposes. When, for example, the shell is utilized to provide a "cube house" having 24' edge dimensions, each module is 4' on edge, a convenient dimension for interior framing or the like. Alternatively, when for example a 16' cubic shell is constructed employing a six module grid design, each module would have 2'8" edge dimensions.

The positions of the respective further supporting frames 15 are coordinated with the locations of the respective rows of modules 32a, 32b and 34b; 33a; etc., in order that each such frame is disposed adjacent one end or the midpoint of each such row of modules. In this manner, the supporting framework is provided in uniform spaced relation adjacent each modular zone to thereby facilitate internal sheathing and finishing of each such zone without the necessity for further internal structural support. The external shell or framework thus provides structurally stable internal unit volumes which do not require internal supports and which are suitable for any desired architectural use.

When it is desired to provide intermediate floors within the building structure defined by the shell or framework 10, one or more additional horizontal load-bearing elements 35 and 36 are provided on the second pair of supporting frames 13 and 14. These load-bearing supports may be provided in the form of composite beams 350 and 360, as in the case of the further horizontal load-bearing elements 200 and 210 utilized in the preferred embodiment of the invention illustrated (FIG. 2). The number of such intermediate load-bearing elements will of course depend upon the size, configuration and specific architectural design for any particular application.

INTEGRATION OF THE SHELL DESIGN WITH A PASSIVE SOLAR HEATING SYSTEM

Figure 4:
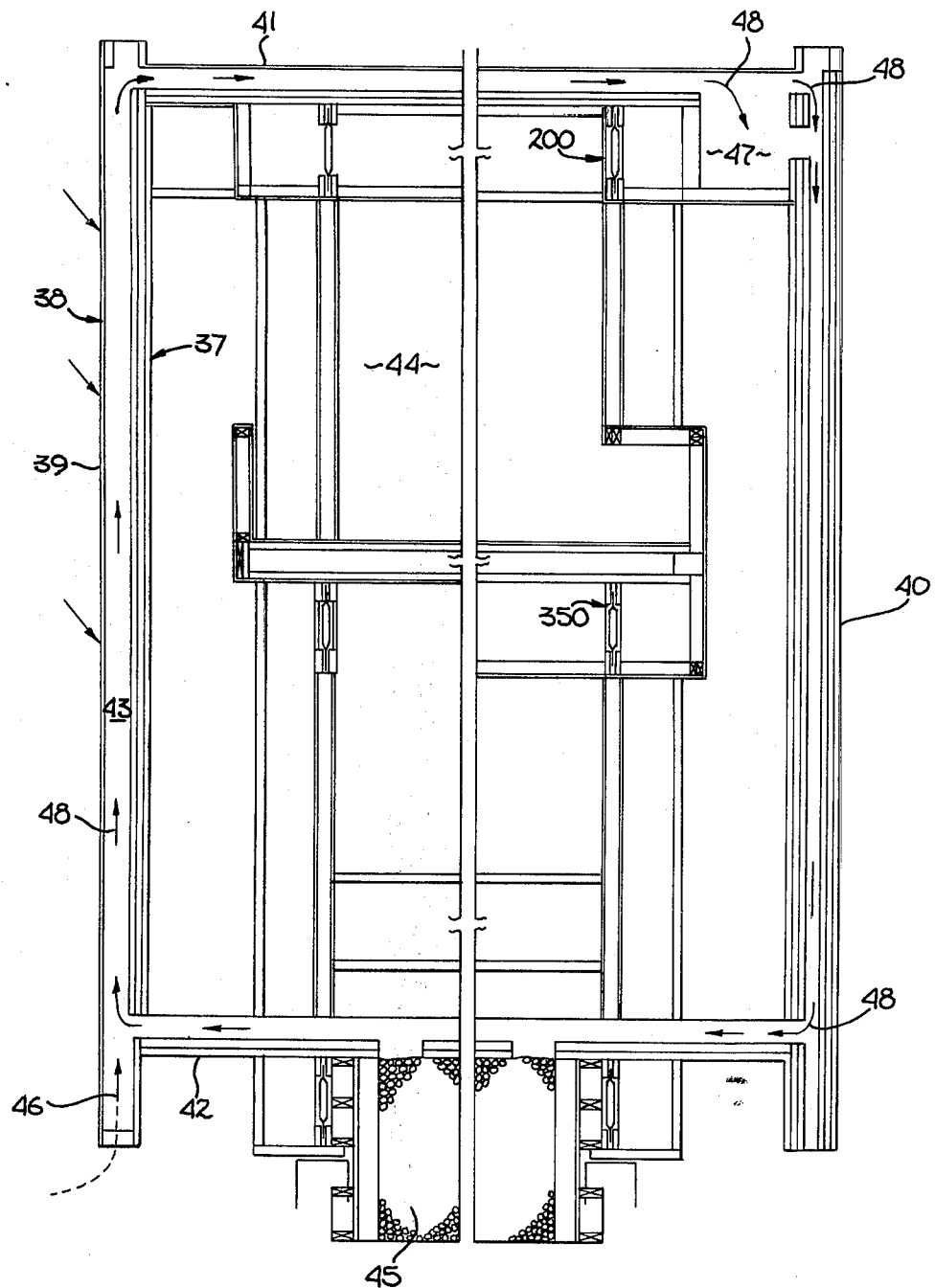
FIG. 4 is a schematic vertical section through an embodiment of a building structure incorporating the rigid shell construction of the invention and integrally defining an annular solar collection and air circulation system therein.

Integration of the structural frame design of the present invention with a passive solar heating system is illustrated in FIG. 4 of the drawings. As shown in cross-section therein, the further supporting frames 15a–15f or the like are provided with internal sheathing (indicated generally at 37) and an external skin (indicated generally at 38) to form side walls 39 and 40, roof 41 and floor 42 of the building structure. The sheathing and skin formed about the supporting frames thus define an annular cavity (indicated generally at 43) which extends about the periphery of the several supporting frames and provides a passive solar heat collection/air circulation system.

As depicted, at least a portion of the external skin 38 is constituted of a translucent material, e.g., glass or a suitable plastic, which admits sunlight into the annular cavity 43. On the other hand, the internal sheathing 37 comprises a suitable thermal insulation material, e.g., four inch plastic foam or other conventional insulation, capable of precluding substantial heat transfer from cavity 43 into the interior 44 of the building. The roof 41 of the structure may be constituted of a conventional radiation-absorptive skin, e.g., a black asphaltic layer over a suitable support.

The annular cavity 43 is integrated with a conventional passive solar energy heating system, e.g., incorporating a thermal storage chamber 45 beneath the floor of the structure, a fresh air inlet duct 46, a hot air plenum 47, and conventional air circulation and inlet devices (not shown). The details of the passive solar heating system are not a part of the present invention, but may rather be provided in a manner known in the art as described, for example, in U.S. Pat. Nos. 3,412,728; 4,051,891; and 4,051,999.

The provision of the annular cavity 43 as an integral part of the shell or framework of the building structural hereof provides an inherently effective solar collection, air circulation system which may be utilized with state of the art passive solar heating systems. There is thus provided, in accordance with the present invention, a solar collection, air circulation system which is integral with the basic building structure and which may be readily and efficiently utilized in connection with otherwise available technology.

It will be understood that orientation of the collector air circulation surfaces, and the particular combination of solar energy-transmissive and thermally insulating materials in the external skin and internal sheathing of the building shell or framework, must be based upon the particular site and climatic conditions involved. Thus, for example, if appropriate solar reflector panels are utilized and earth modeling is strategically carried out, it is possible to direct sunlight onto all four of the air circulating surfaces defined by walls 39 and 40, roof 41 and floor 42. Alternatively, if the two wall plane air circulating surfaces (walls 39) and 40) are placed in generally east-west orientations, they will equally divide the daily sunlight exposure while exposure to the roof and floor planes remains unchanged from the north to south axis of the building structure. Thus, depending upon the specific exposure encountered, the particular arrangement of light transmissive material in the outer skin 38 and thermal insulating material in the inner sheathing 37 may be varied.

On the other hand, in the preferred embodiment of the solar collection air circulation system shown in FIG. 4, wall 39 is oriented in a generally southerly direction and wall 40 is oriented in the opposite, northerly direction. In this embodiment, wall 39 and the roof plane 41 serve as the primary solar collector whereas the northerly-directed wall 40 and floor 42 do not receive direct sunlight. Accordingly, in this embodiment the skin of the southerly-directed wall 39 is primarily constituted of a solar energy-transmissive material, while the internal sheathing thereof comprises a thermally insulating material. Conversely, both the outer skin and the inner sheathing of the northerly-directed wall 40 are constituted of thermally insulating material in order to provide efficient heat flow through the cavity 43 formed therein. The wall 39 thus defines the primary solar collector surface whereas the wall 40 defines the primary air circulation convection region of the preferred embodiment.

In use, the solar collection, air circulation system operates in the known manner of passive solar heat transfer systems. Thus, as the collector surfaces are heated or cooled, they create convective air currents (illustrated by arrows 48) within the air circulating cavity 43. The convection flow has a natural circulatory direction which moves the air peripherally of the building shell or framework and through the heat storage chamber 45. When necessary, circulation may be effectively assisted or forced by fans and dampers in order to increase heat circulation, both within the collector surfaces and within the heat sink. When it is desirable to utilize the stored energy to heat the building interior, a second system of dampers or fans may be utilized to circulate interior air through the heat sink. Alternatively, for cooling the same system may circulate hot interior air through the heat sink volume when heat is to be removed therefrom.

Figure 5:
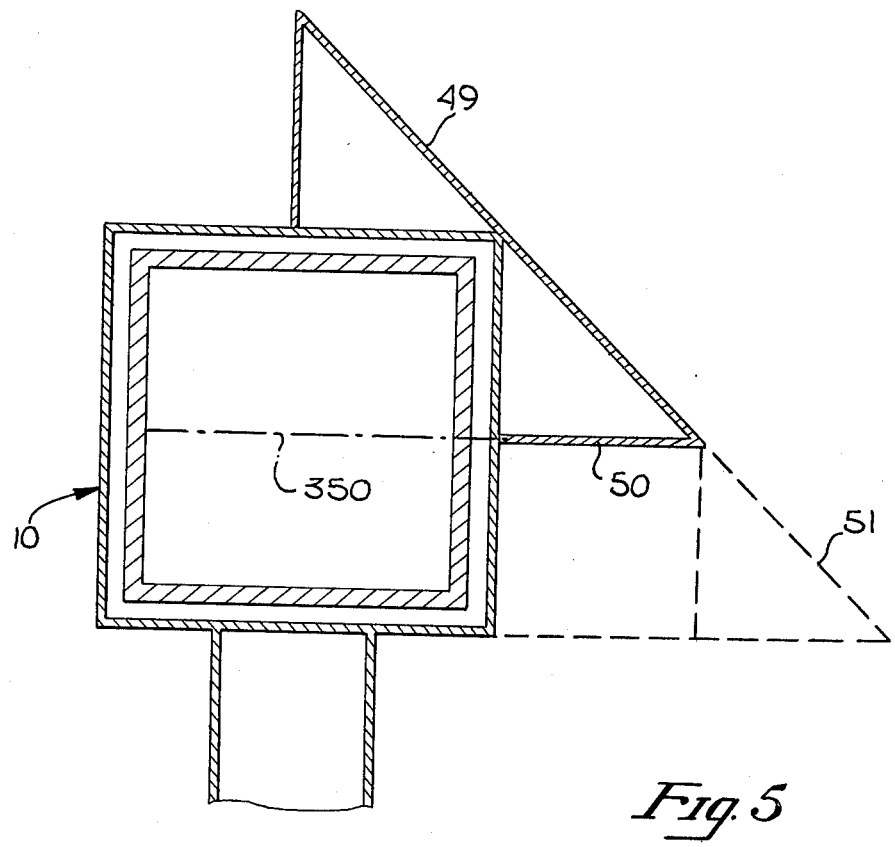
FIG. 5 is a schematic vertical section through an alternative embodiment incorporating a solar collection system having an auxiliary collector hood.

If desired, additional solar insulating or collecting means may also be associated with the building shell or framework of the present invention. Thus, in FIG. 5 an auxiliary solar collector hood 49 is shown above an exterior deck 50 mounted on the building shell or framework 10. The hood 49 thus increases the surface are exposed to solar heating and places additional collector surface area perpendicularly to the sun. Optionally, auxiliary hood 49 may be extended to define a greenhouse enclosure 51 or the like.

It will be understood that these and other modifications of the solar collector structure hereof will occur to those skilled in the art.

In addition, further solar insulating or collecting panels may be movably mounted to the shell or framework 10 to provide variable collector characteristics suitable for particular designs or climatic conditions. Thus, movable solar reflectors, insulating panels or decks, or transparent or opaque grills may be slidably, pivotably or otherwise movably mounted to the building "cube" for improved, variable solar collection and/or heat retention characteristics.

From the preceding it will be seen that there is provided in accordance with the present invention a simple and yet efficient shell or framework for a building structure, which is applicable for a wide variety of architectural purposes and which may be readily and efficiently employed in both small and large scale structures. Moreover, the building shell or framework of the invention may provide a passive solar collection, air circulation system integral with the very building framework, which may be utilized with state of the art passive solar energy heat transfer systems to facilitate efficient and economical solar energy heat conversion.

The preferred embodiments of the invention described hereinabove are described as illustrative only, various changes being possible therein without departing from the principles of the structure hereof. Accordingly, it is intended that the scope of the invention be limited only as defined in the claims appended hereto.

I claim:

1. A rigid shell for a building structure, which comprises:
   (a) a pair of rigid, vertical supporting frames disposed parallel to and spaced from one another by a distance equal to the length of the shell, each of the frames comprising:
      (1) a pair of spaced, horizontally disposed load-bearing elements and
      (2) a pair of spaced, vertically disposed load-bearing members integral with and secured to the pair of horizontal elements at points spaced from the ends of said elements by from $\frac{1}{8}$th to $\frac{1}{4}$th their respective lengths;
   (b) a second pair of rigid, vertical supporting frame disposed parallel to and spaced from one another widthwise of the shell and at right angles to the first pair of supporting frames, each of the second pair of frames comprising:
      (1) a second pair of spaced, horizontally disposed load-bearing elements and
      (2) a second pair of spaced, vertically disposed load-bearing members integral with and secured to the second pair of horizontal elements, said members abutting the vertical load-bearing members of the first pair of supporting frames and being secured thereto along substantially their entire length to define four vertically disposed, load-bearing columns for the shell;
   (c) a plurality of further rigid, vertical supporting frames in spaced relation lengthwise of the shell, intermediate and parallel to the first pair of supporting frames, each of the plurality of frames comprising:
      (1) a third pair of spaced, horizontally disposed load-bearing elements extending across and being supported by the respective members of the pair of horizontal load-bearing elements of each of the second pair of supporting frames, and
      (2) a third pair of spaced, vertically disposed load-bearing members integral with and secured to the third pair of horizontal elements;
   the plurality of further supporting frames being supported by the first and second pairs of supporting frames and, in turn, providing the structural support for the side walls, roof and floor of the building structure defined by said shell; and
   (d) structurally supporting materials covering at least 20% of the side and end wall and roof surfaces defined by said shell to impart sufficient stability to resist climatic torsional and eccentric loading conditions imposed thereon.

2. The rigid shell for a building structure as defined in claim 1, wherein each of the four vertically disposed, load-bearing columns has an L-shaped cross-section, and wherein the legs of said columns are defined by the respective load-bearing members.

3. The rigid shell for a building structure as defined in claims 1 or 2, wherein each one of the first pair of vertical members is secured to the pair of horizontal elements of the respective first supporting frames at a point spaced from the ends of said elements by 1/16th of their lengths; and wherein the rigid shell is divided into six rows of modules disposed parallel to said horizontal elements and into six columns of modules disposed parallel to said vertical members, the individual modules defining structurally stable unit volumes free of internal structural supports and available for any desired architectural use.

4. The rigid shell for a building structure, as defined in claim 1, wherein the upper horizontal element of each one of the second pair of supporting frames is secured to the corresponding vertical members of the first pair of supporting frames at points spaced from the upper ends of said vertical members by a distance equal to the depth of the horizontal of the further plurality of supporting frames, in order that the upper surfaces of the first pair of supporting frames and the plurality of further supporting frames are substantially co-planar.

5. The rigid shell for a building structure as defined in any of claim 1, wherein each of the second pair of supporting frames further includes at least one additional horizontal load-bearing element disposed intermediate the second pair of horizontal load-bearing elements thereof, the additional horizontal elements providing load-bearing support for intermediate floors or the like.

6. The rigid shell for a building structure as defined in any of claim 1, wherein the further supporting frames are substantially uniformly spaced lengthwise of the horizontal elements of the second pair of supporting frames, and wherein the rigid shell is divided into a number of rows of modules disposed parallel to the further supporting frames, the latter being disposed adjacent the ends and mid-points of the respective modules to thereby define structurally stable unit volumes free of internal structural supports and available for any desired architectural use.

7. The rigid shell for a building structure, as defined in any of claim 1, further including:
(e) internal sheathing and external skin provided on said plurality of further vertical supporting frames to form the side walls, roof and floor of the building structure and define an annular cavity extending about the periphery of said shell for solar heat collection and air circulation therethrough,
 (1) at least a portion of the external skin being constituted of a translucent material capable of transmitting solar energy into the cavity, and
 (2) the internal sheathing comprising thermally insulating material capable of precluding substantial heat transfer from the cavity into the interior of the building structure;
(f) a heat sink material communicating with said cavity for absorbing and transmitting sensible heat convected through the cavity by airflow therethrough; and
(g) air circulation means for convecting air through said cavity and into the interior of the building structure for heating and cooling thereof.

8. The rigid shell for a building structure as defined in claim 7, wherein said annular cavity includes:
(h) a southerly directed wall zone having an external skin comprising said solar energy-transmissive translucent material and an internal sheathing comprising said thermally insulating material;
(i) a roof zone having an external skin comprising a solar energy-transmissive material and an internal sheathing comprising said thermally insulating material; and
(j) a northerly directed wall zone having both an external skin and an internal sheathing comprising said thermally insulating material.

* * * * *

UNITED STATES PATENT AND TRADEMARK OFFICE
CERTIFICATE OF CORRECTION

PATENT NO. : 4,296,797
DATED : October 27, 1981
INVENTOR(S) : George R. Beggs

It is certified that error appears in the above—identified patent and that said Letters Patent is hereby corrected as shown below:

Column 6, line 7: "structural" should read --structure--.

Column 6, line 27: "39)" should read --39--.

Column 7, line 10: "are" should read --area--.

Column 7, line 59: "frame" should read --frames--.

Signed and Sealed this

Twenty-seventh Day of April 1982

[SEAL]

Attest:

GERALD J. MOSSINGHOFF

Attesting Officer       Commissioner of Patents and Trademarks